Aug. 8, 1939.    L. A. KILGORE    2,169,027
DISCHARGE PROTECTIVE SYSTEM
Filed May 26, 1938
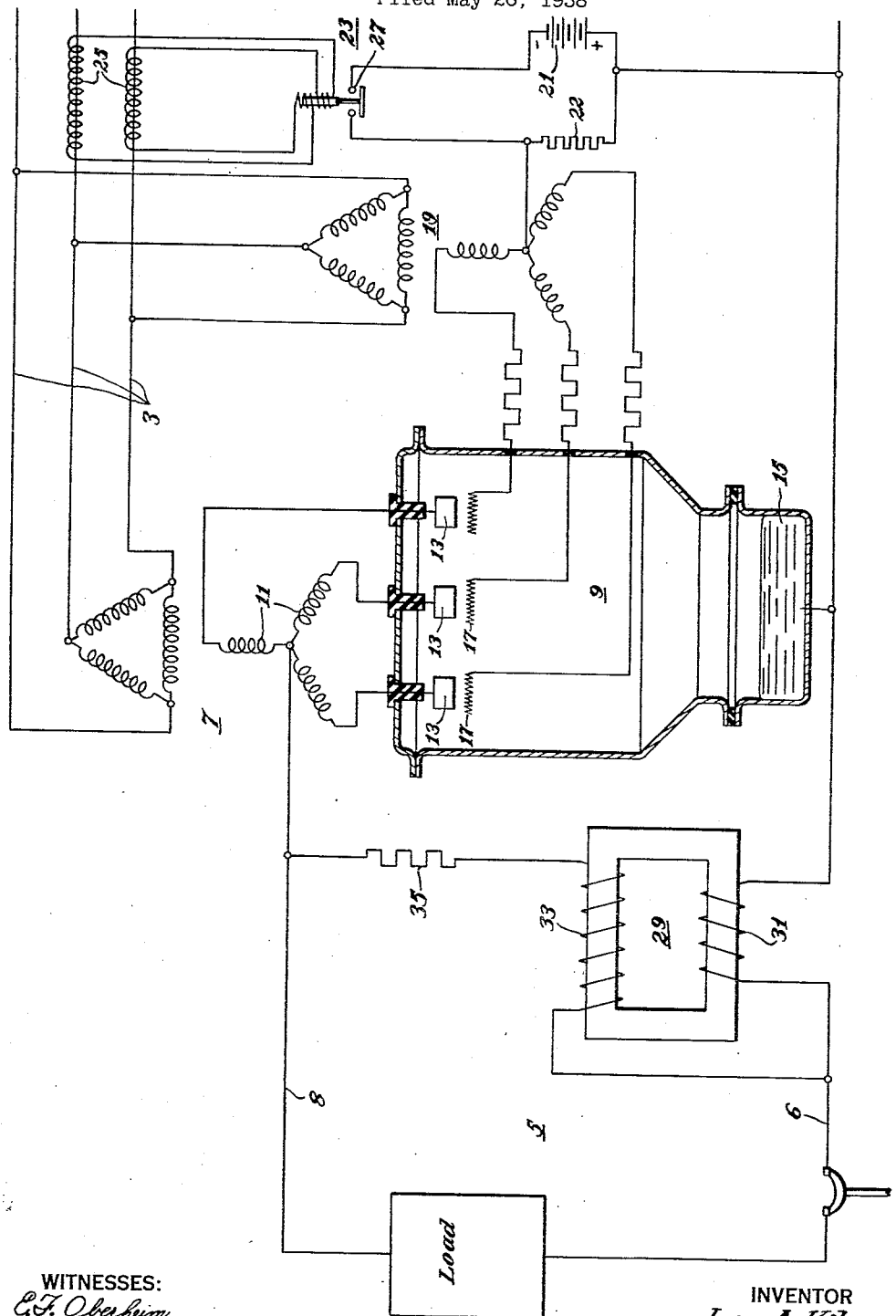
WITNESSES:
E.F. Oberheim.
J. Thomas Danko
INVENTOR
Lee A. Kilgore.
BY
S. A. Stricklett
ATTORNEY Patented Aug. 8, 1939

2,169,027

UNITED STATES PATENT OFFICE 2,169,027

DISCHARGE PROTECTIVE SYSTEM

Lee A. Kilgore, Forest Hills, Pa., assignor to Westinghouse Electric & Manufacturing Company, East Pittsburgh, Pa., a corporation of Pennsylvania Application May 26, 1938, Serial No. 210,188

2 Claims. (Cl. 175—363)

My invention relates to vapor-electric converters and particularly to a protective system for interrupting fault currents flowing through such converters and for reestablishing the normal current flow thereafter.

In the operation of vapor-electric converters, it is customary to interrupt the flow of abnormal currents through such converters by negatively energizing the control electrodes thereof with respect to the associated cathode. However, when such converters are supplying current to a load where there is a counter-electromotive force developed or where the converter is operated in parallel with other sources of direct current, it has not been possible to apply negative bias to the associated grids until the direct-current circuit breakers were opened. The opening of these breakers was necessary to prevent the back feed current of the direct-current source from flowing into the converter, a condition which would obviously maintain an arc.

According to my invention, I employ a system for interrupting abnormal currents without the necessity for opening the direct-current breakers. Briefly, I utilize an iron core reactor having a plurality of windings in the direct-current circuit to prevent the reversal of back feed current for a time interval sufficient to stop all anodes, including the one backfiring, from carrying the arc through the application of blocking potential. One winding of the reactor is placed in series with the direct-current line, while another winding having more turns in comparison with the series winding is placed in shunt with the direct-current circuit. The reactor has a sufficient number of turns and flux capacity to maintain the difference in the voltages between the backfiring rectifier and the direct-current circuit for perhaps a little over a cycle before permitting a reversal of current.

It is, therefore, an object of my invention to provide a protective system for a vapor-electric converter whereby the fault currents may be interrupted without opening the direct-current circuit breakers.

Another object of my invention is to provide reactor means for prolonging the time back feed currents can be prevented from flowing into the converter until the fault is cleared.

Still further, it is an object of my invention to provide a protective system for a vapor-electric converter for supplying a counter-electromotive force load whereby the flow of current through the converter is interrupted upon the occurrence of a fault therein and is not reestablished until the internal short circuit is removed.

Other objects and advantages of my invention will be apparent from the following detailed description taken in conjunction with the accompanying drawing, in which the single figure is a schematic illustration of a vapor-electric converter and its associated protective devices according to my invention.

The apparatus according to my invention comprises an alternating-current circuit 3 of any desired voltage and of any number of phases, herein represented as a three-phase line, and a direct-current circuit 5, said alternating-current and direct-current circuits 3 and 5 being connected by means of a suitable transformer 7 and a vapor-electric converter 9 for controlling the flow of currents between said circuits 3 and 5. The transformer 7 is provided with a secondary winding 11 having a plurality of phase displaced windings, severally connected with the anodes 13 of the converter 9 having a cathode 15.

A suitable control electrode 17, such as a grid, is associated with each of the anodes 13 of the converter 9 and is provided with a suitable source of control potential by means of an auxiliary transformer 19 having the same number of phases and the same frequency as the converter transformer 7. The cathode 15 is connected to the neutral point of the auxiliary transformer 19 in series with a battery 21, the positive pole of which is connected to the cathode 15, while the negative pole is connected to the neutral of the auxiliary transformer 19.

Negative bias is supplied from the battery 21 to the control electrodes 17 through the operation of a suitable high-speed relay 23 which is energized by a current transformer 25 in the alternating-current circuit 3 in the event of a backfire or a sudden overload. In normal operation, the relay contacts 27 are opened so that the battery 21 is disconnected from the control electrodes 17.

It is assumed that alternating current obtained from the alternating-current line 3 is to be converted into direct current to be supplied to a direct-current line 5 where a counter-electromotive force is developed, said direct-current line 5 having a positive conductor 6 and a negative conductor 8. A suitable reactor 29 having either a single winding 31 or a plurality of windings 31 and 33 is connected in the direct-current line 5. One of the windings 31 of the reactor 29 is connected in series with the direct-current conductor 6, and another winding 33 is connected in parallel with the direct-current line 5 in series with a suitable resistor 35 so as to limit the current flowing through the winding 33 to a small value relative to the full load current.

Under normal operation, the windings 31 and 33 of the reactor 29 are so arranged that the magnetomotive forces oppose each other with the series winding 31 predominating in strength for all loads above a predetermined value, for example, 10% of the full load current. In the event of a backfire in the converter 9, an unbalanced current in the alternating-current line 3 will energize the relay 23 which will close its contacts 27, and which in turn will connect the battery 21 to the resistance 22 connected to the auxiliary transformer 19 so as to apply blocking potentials to the grids 17. The anodes 13 not conducting will thereby be permanently blocked while the particular anode 13 carrying the current at the instance of backfire will continue to be operative, but will become extinguished after the zero current line has been reached, which is in general, the end of the corresponding half cycle. However, the next anode 13 in commutating sequence will be prevented from conducting the arc due to the fact that its control electrode 17 has been given a blocking potential by the battery 21.

In the meantime, while blocking potentials are being applied to the grids 17, back feed currents will be flowing into the backfiring anode 13 if the reactor 29 in the circuit was not present. When the current from the rectifier 9 decreases a predetermined amount and approaches zero, the opposing magnetomotive forces in the iron core reactor 29 will reverse, resulting in a complete reversal of flux. The net effect of the reactor is that the time is practically doubled in which the load current would be prevented from reversing, for while the load current is above a predetermined value, any decrease of current is opposed by the electromotive force of the inductance, and when a sudden reversal of flux takes place when the current decreases below this predetermined value, which for purpose of illustration, I have chosen to be 10% of the full load current, the electrical inertia offered by the growing lines of force further opposes a reversal of the load current. In other words, the flux capacity of the iron core reactor 29 can maintain a difference in the voltages between the backfiring converter 9 and the direct-current line 5 for a period of over one cycle before permitting load currents to flow into the backfiring anode 13.

While I have shown and described certain specific embodiments of my invention, it will be apparent that many changes and modifications can be made therein without departing from the true spirit of my invention or the scope of the appended claims.

I claim as my invention:

1. In an electron discharge device protective system, an alternating-current supply circuit, electron discharge means connected with said circuit and having a plurality of anodes with associated control electrodes and a cathode, relay means responsive to faulty conditions in said discharge means for connecting blocking potential to said control electrodes, a direct-current output circuit connected with said discharge means and a reactor in said direct-current circuit, said reactor having a plurality of windings, one of said windings connected in series with said direct-current line, another of said windings connected in parallel with said direct-current circuit, the direction of current flow in said windings being dependent upon load conditions in said discharge means.

2. An electrical system comprising a supply circuit, a load circuit, a vapor-electric converter interposed between said circuits, said converter comprising a plurality of anodes with associated control electrodes and a cathode, relay means responsive to arc backs in said converter for connecting blocking potentials to said control electrodes and a reactor in said load circuit, said reactor comprising a plurality of windings, one of said windings serially connected with said load circuit, another of said windings connected in shunt with said load circuit, the magnetomotive forces of said windings caused to be in opposition for load currents above a predetermined value and subject to a complete reversal upon a predetermined decrease in the load current whereby back feed currents are prevented from reversing until all of said anodes cease conducting.

LEE A. KILGORE.